United States Patent [19]

Thomas

[11] Patent Number: 4,817,325

[45] Date of Patent: Apr. 4, 1989

[54] FISHING LURE

[76] Inventor: John Thomas, 1984 Canna St., Thousand Oaks, Calif. 91360

[21] Appl. No.: 51,502

[22] Filed: May 18, 1987

[51] Int. Cl.$^4$ .............................................. A01K 83/00
[52] U.S. Cl. ..................................... 43/42.1; 43/43.2; 43/42.24
[58] Field of Search ...................... 43/42.1, 43.2, 43.4, 43/42.34, 42.4, 42.24

[56] References Cited

U.S. PATENT DOCUMENTS

| | | | |
|---|---|---|---|
| 779,744 | 1/1905 | Shakespeare | 43/42.1 |
| 1,124,719 | 0/1915 | Fischer | |
| 1,948,983 | 2/1934 | Danielczuk | 43/42.1 |
| 2,191,244 | 2/1940 | Wise | 43/42.1 |
| 3,170,756 | 2/1965 | Butler | 43/43.4 |
| 3,331,151 | 0/1965 | Turrentine | |
| 3,722,128 | 3/1973 | Tremblay | 43/42.1 |
| 3,914,895 | 10/1975 | Mize | 43/42.1 |
| 4,054,004 | 10/1977 | Schott | 43/42.1 |
| 4,217,721 | 8/1980 | Hershberger | 43/43.2 |
| 4,433,503 | 2/1984 | Schlief | 43/42.1 |

Primary Examiner—Nicholas P. Godici
Assistant Examiner—Karen Skillman
Attorney, Agent, or Firm—Poms, Smith, Lande & Rose

[57] ABSTRACT

A weed protector has a body of flexible foam material. The hook portions of the fishing hooks pushes on the outer surface or extend into grooves in the body. When a fish strikes, it can collapse the form exposing the barbed ends of the hooks to the fish's mouth. The body can compress axially to accommodate different sized shanks. The shanks of the hook are attached by a ring to a connector which extends out of the front end of the body, and the flexible foam material permits the connector and the hook to pivot somewhat with respect to each other. The front end of the body is tapered to deflect weed and other debris. The front may have a separate, hard cap that prevents weeds from engaging the front of the body.

8 Claims, 1 Drawing Sheet

// FISHING LURE

BACKGROUND OF THE INVENTION

1. Field of the Invention

The present invention relates to a fishing lure preventing the lure from catching on weeds, rocks and roots.

2. Description of the Prior Art

There have been a number of guards for fishing hooks that purport to prevent them from catching on weeds or on the lake or river bed. Examples are Fischer, U.S. Pat. No. 1,124,719 (1915), which has two body members that pivot from an open position to shield opposing hooks to a closed position when a fish bites to expose the hooks. Bergren, U.S. Pat. No. 1,473,564 (1949), surrounds three circumferentially spaced hooks with a cage of fine resilient wire. A fish biting pressed in on the wire to reach the hooks. Turrentine, U.S. Pat. No. 3,331,151 (1967), has three hooks that can pivot with respect to each other and have their barbed ends facing inward. The top of the shanks are covered by a resilient body. The fish biting on the shank on one of the hooks causes the pointed end of that hook to pivot away from the other hooks where it can enter the mouth of the fish. Lastly, Hershberger, U.S. Pat. No. 4,217,721 (1980), discloses a skirt which carries a treble hook. The skirt is formed of thin plastic and has grooves for receiving the pointed end of the fish hooks. A biting fish collapses the skirt to engage the hook.

The prior art has some disadvantages. For example, the plastic material in Hersberger can be deformed by repeated strikes such that the barbed ends can be exposed where they can catch on weeds and other debris in the water. The front end of the shield is of the same material so that it may deform and catch as it is pulled over the rocks and tree branches. The weight of the lures is not easily controllable. Because all are made of hard, non-porous materials, they cannot hold fish attracting liquids. Lastly, the shape of the internal, central opening that receives the shank ends of the hook is fixed and cannot accommodate rings and different sized connectors.

SUMMARY OF THE INVENTION

It is an object of the present invention to disclose and provide a fishing lure that overcomes some of the problems in the prior art. Specifically, it is an object of the present invention to disclose and provide a lure: (1) that offers continued protection for the hooks even after repeated use; (2) that can be modified to sink when it is wet; (3) that can absorb fish attracting liquids; (4) that the inside can accommodate different sized hook connections; (5) that can be provided with protection for the front portion on the end opposite the hooks to help guide it over weeds, rocks and logs; (6) that can resiliently deform axially as well as radially when it encounters obstacles; and (7) that can bend at its center. The present invention meets those objects as well as others that will be evident in the detailed description of the preferred embodiment.

The present invention has a body member of flexible, foam material having a central opening which receives the shanks of a plurality of fishing hooks. The top portion of the body member tapers as a cone or truncated cone. The bottom may be curved or cylindrical. The radius of the bottom portion of the body member is slightly greater than the distance from the shank to the pointed portion of the hook. In one embodiment, the pointed portion of the hook pushes against the outside of the foam body member so that the hook portions slightly compress the foam, and the foam protects the hooks. In another embodiment, the foam body has receiving grooves spaced around the outside for receiving the barbed hooks. When a fish bites and the foam plastic collapses, the barbed ends of the hooks are exposed where they can catch on the mouth of the fish. Additional grooves can be provided for guiding the lures through the water.

An optional hard cap at the front end of the lure helps to guide the lure over debris in the water. The form body also compresses axially when the cap hits a rock or tree root to help absorb the forces. A connector, which extends from the leader clip into the central opening in the body also extends through a central opening in the cap. The central opening of the body also accommodates a ring that holds the shank end of the hook to the connecting member so that they pivot with respect to each other. The foam material can expand somewhat to accommodate different sized elements.

DETAILED DESCRIPTION OF THE PREFERRED EMBODIMENTS

Figure 1:
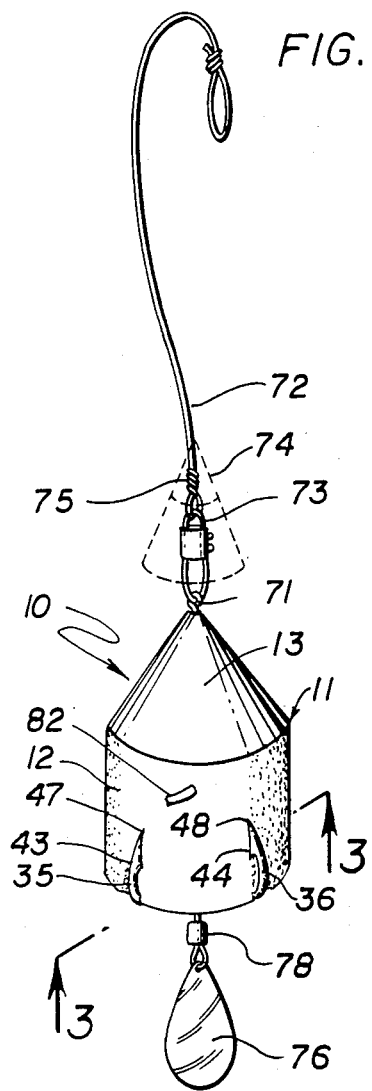
FIG. 1 is a perspective view of the first embodiment of the lure of the present invention.
Figure 2:
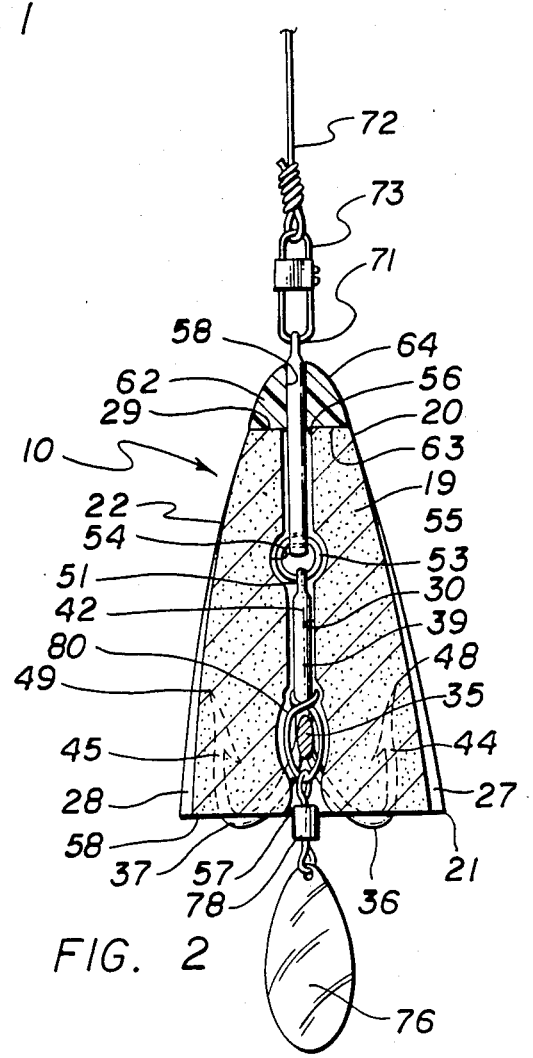
FIG. 2 is a sectional elevation of the second exemplary embodiment of the present invention.

The fishing lure of the present invention is referred to generally at 10 in the drawings of the exemplary embodiments. While the lure could be used with any reasonable number of hooks, in the exemplary embodiments three hooks are used, 35, 36 and 37. Each hook has a shank portion e.g. portion 39 of hook 35 (FIG. 2) and a hook portion 43, 44 and 45 extending around from the bottom end of each shank. The top of the shank portion merges into a single shank 42 (FIG. 2). The hook portions terminates in barbed pointed ends 47, 48 and 49 (FIGS. 1 and 2). The upper end of the merged shank 42 has an attaching eye 51 (FIG. 2) for receiving the attaching ring 57. Foamed polystyrene is the preferred material. Open-celled plastic will tend to sink. closed-cell material floats.

The body of lure 10 is formed of flexible foam plastic. The body has a tapered front end and a larger diameter rear end. It make take several different shapes, two of which are shown in the exemplary embodiments. In the exemplary embodiment of FIG. 1, body 11 has a cylindrical, lower portion, and a conical, upper portion 13. Body 10 is a single piece of foam plastic. One way of making the body is to use a sheet of foam plastic of a thickness equal to the desired height of body 11. A machine punches cylindrical plugs of a diameter equal to the diameter of the cylindrical lower portion 12 from the sheet. At the same time, a small diameter opening 23 (FIGS. 3 and 4) is punched through the center of body 11. The upper, conical shaped portion may be cut using a band saw or other similar tool. Conical end 13 may be dipped in a resin to create a hard, tapered front for protecting the rest of body 10.

For substantially higher production, the process can be automated. Alternatively, individual body members may be molded into the desired shape using conventional foam molding techniques.

Figure 3:
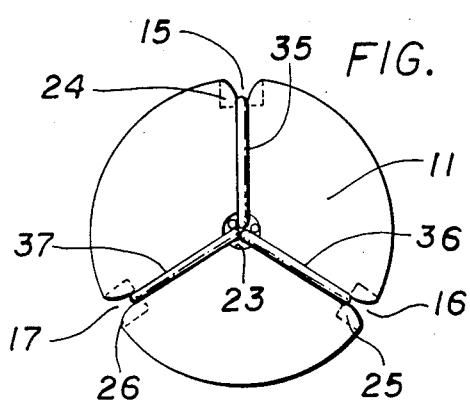
FIG. 3 is a bottom view looking through plane 3—3 of FIG. 1 showing the body member in its normal, expanded position.
Figure 4:
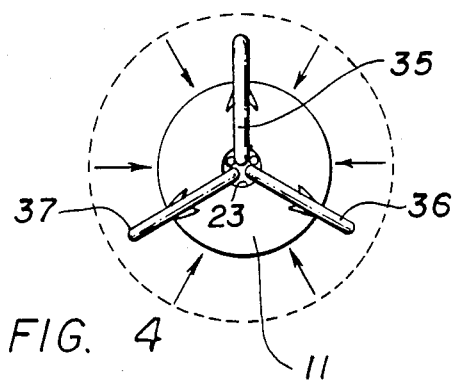
FIG. 4 is a view similar to FIG. 3 showing the ability of the form body member to change shape and collapse inwardly when bitten by a fish.

The radius of the lower, cylindrical portion 12 of body 11 is slightly greater than the distance from the shank portion 39 to the hook portion 43, 44 or 45 when the foam is in its normal position. When body 11 is mated with the triple hooks, it is squeezed somewhat so that the hook portions can pass over the outside of the outer surface of the lower portion 12. As FIG. 3 shows, when body 11 is released, the hook portions create small indentations 15, 16 and 17 in the foam material, which partially cover the pointed ends 47, 48 and 49 of the hooks.

FIG. 2 shows a second exemplary embodiment for the body. In the second embodiment, body 12 has a shape similar to a truncated cone with a wider diameter at the bottom that at the top. Surface 22 of body 19 curves somewhat from the top 20 to the bottom 21. In this exemplary embodiment there are circumferentially spaced grooves cut into the outside surface 22 of body 11. The grooves act as receiving grooves and receive hook portions 43, 44 and 45 of the hooks. Because of the orientation of FIG. 2, the receiving grooves are not visible in that drawing. Grooves 24, 25 and 26, however, are shown in phantom in FIG. 3. The nominal outside of surface 22 extends beyond the outside of hook portions 43-45 to shield the barbed ends of the hook and prevent them from engaging weeds or other debris. Additional grooves such as grooves 27 and 28 may also be provided to give stability to the body as it moves through the water during trolling. The grooves thus provide an advantage, but they require an additional manufacturing step and add to the cost of the body.

When a fish bites on body 11 or 19, the foam collapses (FIG. 4) such that the barbed ends can engage the mouth of the fish. The resilient nature of the foam does not interfere with the fish striking the hook portion. Therefore, the body 11 or 19 protects the hooks from snagging on debris but does not interfere with fish biting on the hook.

It may be desirable to protect the top of body 11 or 19 from direct contact with debris in the water. Because of the compressible nature of the foam material, if the front end encountered such debris, the end might grab the debris and catch or damage the lure. Therefore, a hard cap 62 (FIG. 2) of a rigid plastic may be provided. Cap 62 has a bottom surface 63 that rests on upper surface 29 of body member 19. Curved surface 64 of cap 62 (FIG. 2) continues the curvature of surface 22 of body 19. The outside diameter of cap 62 near its bottom 63 is approximately the same as the outside diameter of body 19 near its top 20 so that no part of top surface 20 is exposed to weed or other debris when the lure moves through the water. No cap is shown in the FIG. 1 embodiment. The cap is an optional feature. If a hard cap is desired, it can take several other forms. A cap could comprise a thin conical member with a hollow center receiving the upper conical portion 13. Likewise, the entire conical portion 13 could be replaced by a conical cap having an outer diameter at its base equal to the diameter of cylindrical, lower portion 12.

Shank portions such as shank 39 of the hooks and upper shanks 42 are received within central opening 23 (FIG. 3) or 30 (FIG. 2) of the body. As shown in the second exemplary embodiment of FIG. 2, shanks 39 and 41 extend slightly more than halfway from the bottom 21 of body member 19. Attaching eye 51 on upper shank 42 receives ring 53 which in turn is attached to connector 55. FIG. 2 shows a slightly wider portin 54 of central opening 30. Ring 53 pushes the foam material to create the larger opening 54 as the ring is pulled through central opening 30. The connector 55 extends out of the top 56 of central opening 30. Opening 58 through cap 62 is aligned with central opening 30 of body member 19, and connector member 55 extends out of the top of cap 62. Hole 71 (FIGS. 1 and 2) at the top of connector 55 projects a short distance above the top of cap 62. Clip 73 attached at the end of leader 72 engages hole 71.

FIG. 1 shows leader 72 threaded through an optional small hard cone 74. Knot 75 and clip 73 are received within the cone so that they do not catch debris. Cone 74 also deflects some debris from hitting body 11.

The bottom of the shanks 39 (FIG. 2) extend out of the bottom 57 of central opening 30. The curved bottom portions of hooks 35–37 stay adjacent bottom surface 58 of body member 19. By maintaining this curved portion adjacent to bottom surface 58, it is less likely that weeds and other debris can catch in the space between the hooks and the bottom of the body member.

One of the advantages of foam material is that it can be compressed on axis to accommodate variations in the length of the shanks 39, connector 59 and ring 57. The slight axial compression also improves the ability of the hook to set in the mouth of the fish because the barbed ends 47–49 move somewhat axially relative to a fixed portion of the body while the remaining portion compresses axially.

Ring 53 is protected from engaging weeds and the like because it is placed within central opening 30. Moreover, flexible body 11 or 19 can bend. Ring 53, which permits connector 55 to pivot relative to hooks 35–37, allows body member 11 or 19 to bend about that point. This gives a more realistic appearance to fish.

The lure may also be provided with a small reflector or other fish attractor. As shown in FIGS. 1 and 2, reflector 76 is attached by a swivel 78 to a short wire connector 80 that wraps around shanks 39 and extends slightly below the region where the hooks diverge. Swivel 78 or connecting wire 80 may also secure another identical or similar lure.

The foam material of body member 11 or 19 may be impregnated with liquids that attract fish. The foam material allows the liquid to be disposed slowly from the lure and also allows the lure to hold much more of such fluids that could be held if the liquid were only on the surface of the lure.

The foam material also is capable of holding small pieces of flexible material. As FIG. 1 shows, a small piece of a rubber band 82 is threaded through the foam material of body 10. Several pieces of other types of material can be threaded through the body of act as fish attracters. The foam material also accepts paint so that the surface of body 10 can be colored or have shapes painted on it.

Various modifications and changes may be made in the configuration described above that come within the spirit of the invention. The invention embraces all such changes and modifications coming within the scope of the appended claims.

I claim:

1. A fishing lure comprising:
   (a) a plurality of fishing hooks each having a shank and a hook portion attached to the shank, each hook portion having a hooking end, means for connecting the fishing hooks together along their shanks such that the hook portions are circumferentially spaced from each other;
   (b) body means of flexible foam material having a central opening for receiving the shanks in the central opening and the hook portions extending out of the body means, the body means having a relaxed state and a compressed state, the body means having a first body portion the body means having a second body portion attached to the top of the first body portion, the second body portion having an outside surface contacting the outer surface of the first body and tapering inward from the outside surface of the first body portion;
   (c) wherein the radius of the body member in its relaxed state at the hook portion is greater than the distance from the shank to the hook portions, the hook portions pushing on the foam material to embed themselves partially in the body means.

2. The fishing lure of claim 1 wherein the first body portion is cylindrical and the second body portion is conical.

3. The fishing lure of claim 1 further comprising at least one piece of flexible material extending at least partially into the outside surface of the body means and extending out from it.

4. The fishing lure of claim 1 further comprising a coating of material harder than the material of the body means covering substantially all of the surface of the second body portion.

5. The fishing lure of claim 1 further comprising an upper shank within the central opening of the body means, a flexible connector attached to the upper shank and attached to at least one of the shanks of the fishing hooks.

6. The fishing lure of claim 1 wherein the substantially cylindrical shape of the first body portion has a circular cross-section.

7. The weed guard of claim 1 wherein the central opening has a wall surrounding the shanks in close proximity to the shanks when the body means is in its compressed and relaxed states.

8. The weed guard of claim 1 wherein the body means is generally solid.

* * * * *